(12) United States Patent  
Clark et al.

(10) Patent No.: US 7,390,096 B2  
(45) Date of Patent: Jun. 24, 2008

(54) LAMP TO ILLUMINATION OPTICS ASSEMBLY INTERFACE

(75) Inventors: Stephan Clark, NW Albany, OR (US); Dennis Scott Prows, Cincinnati, OH (US); Sammy Lee Ekker, New Port Richey, FL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 222 days.

(21) Appl. No.: 10/989,149

(22) Filed: Nov. 15, 2004

(65) Prior Publication Data

US 2006/0103814 A1 May 18, 2006

(51) Int. Cl.
 *G03B 21/14* (2006.01)
(52) U.S. Cl. .............. 353/87; 353/98; 362/288
(58) Field of Classification Search ........... 353/98, 353/119, 87, 122, 85, 100, 101; 362/263, 362/261, 269, 270, 277, 285, 288, 368
 See application file for complete search history.

(56) References Cited

U.S. PATENT DOCUMENTS

| 1,654,391 | A | * | 12/1927 | Thornton | ........... 352/198 |
| 3,761,170 | A | * | 9/1973 | Genesky et al. | ........... 353/87 |
| 5,347,324 | A | * | 9/1994 | Sasaki et al. | ........... 348/789 |
| 5,842,761 | A | * | 12/1998 | Futakami et al. | ........... 353/119 |
| 6,056,405 | A | | 5/2000 | Heintz et al. | |
| 6,454,418 | B2 | * | 9/2002 | Lee et al. | ........... 353/87 |
| 2004/0165386 | A1 | | 8/2004 | Lee et al. | |
| 2004/0223125 | A1 | * | 11/2004 | Tamaru et al. | ........... 353/119 |
| 2004/0233397 | A1 | * | 11/2004 | Takemi | ........... 353/97 |
| 2006/0077350 | A1 | * | 4/2006 | De Vaan | ........... 353/20 |

FOREIGN PATENT DOCUMENTS

| JP | 08-160420 A | 6/1996 |
| JP | 03-097940 | 2/2004 |

* cited by examiner

*Primary Examiner*—William C. Dowling

(57) ABSTRACT

A lamp and illumination optics assembly interface includes an illumination optics mount having a plurality of datum features formed thereon, and a lamp, wherein the lamp is configured to be substantially directly coupled to the illumination optics housing.

18 Claims, 5 Drawing Sheets

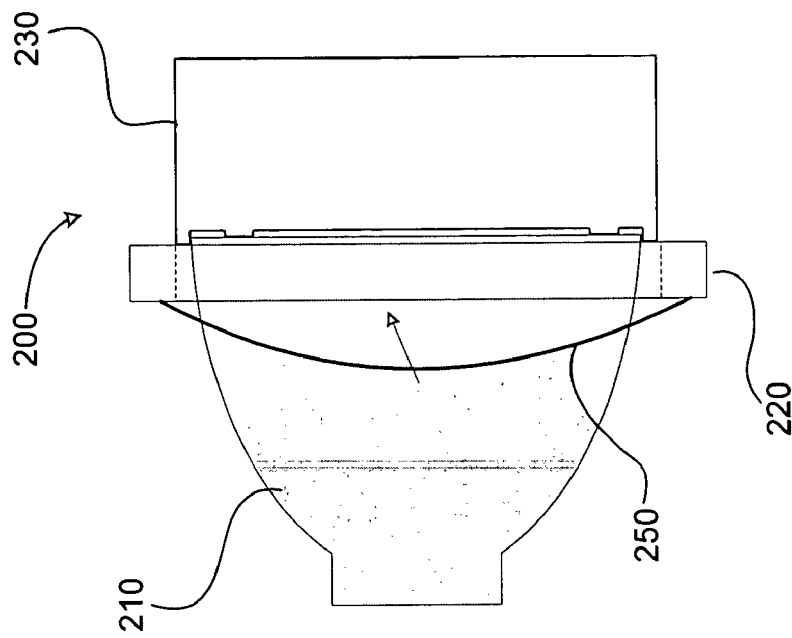
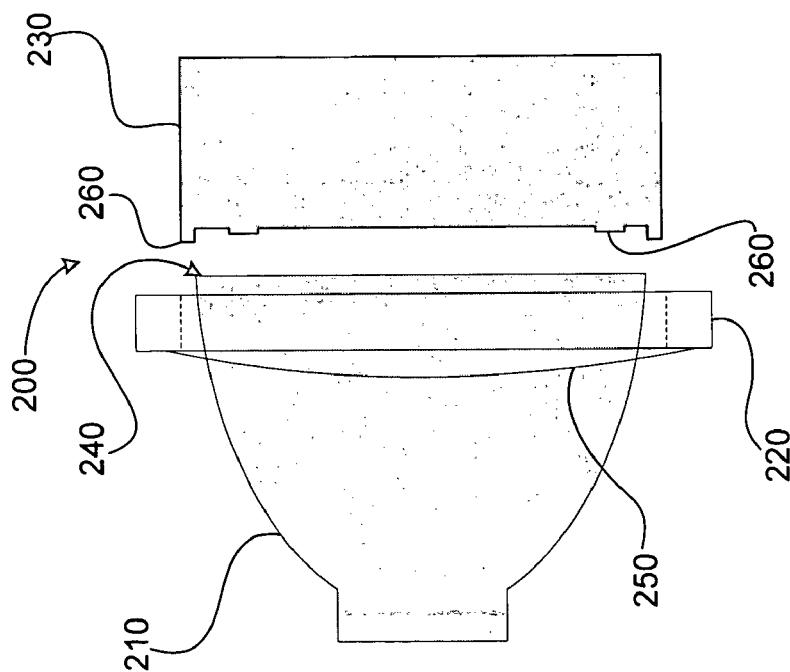

LAMP TO ILLUMINATION OPTICS ASSEMBLY INTERFACE

BACKGROUND

Digital projectors, such as digital micro-mirror device (DMD) and liquid crystal device (LCD) projectors, project high-quality images onto a viewing surface. Both DMD and LCD projectors utilize high-intensity lamps and reflectors to generate the light needed for projection. Light generated by the lamp is concentrated as a "fireball" that is located at a focal point of a reflector. Light produced by the fireball is frequently directed from the lamp to an illumination optics assembly. The illumination optics assembly then focuses the light onto a spatial light modulator that produces images and utilizes the generated light to project the image onto a viewing surface. The efficiency of the lamp depends, at least in part, on the alignment of the lamp to the illumination optics, the lamp being held in place by a lamp bracket. Lamp alignment is of primary concern when using elliptical reflectors.

As a result, efforts have been directed at ensuring that the illumination optics assembly is properly oriented and aligned with respect to the lamp bracket. One prior solution consisted of registration pins and mating holes on small area flats. These registration pins have multiple tolerances corresponding to the position and diameters of each set of mating holes. Accordingly, the location of the corresponding points or datums is such that positional accuracy and joint stability are not optimized. The accuracy of such a lamp bracket and illumination optics assembly is determined, at least in part, by independently formed features that are then assembled.

Each part may be formed with a certain degree of accuracy. The accuracy with which the part can be formed is known as a tolerance. For example, if a part can accurately be formed within +/−0.001 inches of the idealized part shape, it has a tolerance of 0.001 inches. If four such parts are assembled, then the corresponding accuracy of the part is additive, such that the tolerance of the assembly is no more accurate than 0.004 inches, in addition to the tolerance associated with putting the assembly together.

As a result, the accuracy of the lamp receiver discussed above depends on the accuracy of each of the independently formed parts as well as the accuracy of the resulting assembly. The total of these tolerances may become sufficiently large to cause the image uniformity and brightness to suffer. In addition, the formation of such lamp receivers can be relatively expensive.

SUMMARY

A lamp and illumination optics assembly interface includes an illumination optics mount having a plurality of datum features formed thereon, and a lamp wherein the lamp is configured to be substantially directly coupled to the illumination optics housing.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

FIG. 2-1 illustrates a schematic view of a lamp bracket and illumination optics assembly interface according to one exemplary embodiment.

FIG. 2-2 illustrates a schematic view of a lamp bracket and illumination optics assembly interface according to one exemplary embodiment.

FIG. 3-1 illustrates a perspective view from the proximal end of a housing assembly having a lamp coupled thereto according to one exemplary embodiment.

FIG. 3-2 illustrates a perspective view from a distal end of a housing assembly having a lamp coupled thereto according to one exemplary embodiment.

FIG. 4-1 illustrates a perspective view from the distal end of an illumination optics mount according to one exemplary embodiment.

FIG. 4-2 illustrates a perspective view from the proximal end of an illumination optics mount according to one exemplary embodiment.

Throughout the drawings, identical reference numbers designate similar, but not necessarily identical, elements.

DETAILED DESCRIPTION

The present method and apparatus provide for reliable, repeatable, and accurate alignment of an illumination optics assembly with respect to a lamp bracket. In particular, the present system and method provide for the direct reference of a lamp with respect to an illumination optics assembly.

In the following description, for purposes of explanation, numerous specific details are set forth in order to provide a thorough understanding of the present method and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
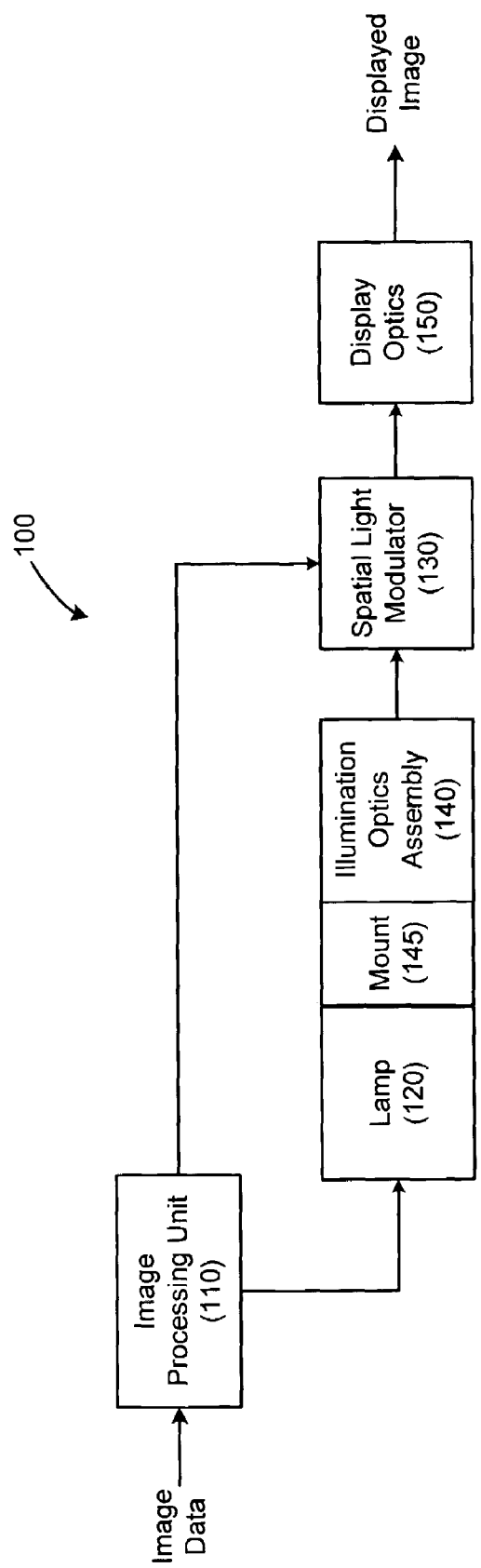
FIG. 1 illustrates a schematic view of a display system according to one exemplary embodiment.

FIG. 1 illustrates an exemplary display system (100). The components of FIG. 1 are exemplary only and may be modified or changed as best serves a particular application. As shown in FIG. 1, image data is input into an image processing unit (110). The image data defines an image that is to be displayed by the display system (100). While one image is illustrated and described as being processed by the image processing unit (110), it will be understood by one skilled in the art that a plurality or series of images may equally be processed by the image processing unit (110). The image processing unit (110) performs various functions including controlling the illumination of a lamp (120) and controlling a spatial light modulator (SLM) (130).

The lamp (120) is coupled directly to an illumination optics assembly (140). The illumination optics assembly (140) directs light from the lamp (120) to the SLM (130). The lamp (120) and illumination optics assembly (140) are supported by a housing assembly. In particular, a housing assembly maintains the lamp (120) in aligned and substantially direct contact with an illumination optics mount (145), which part of the illumination optics assembly (140). According to one exemplary embodiment discussed in more detail below, the lamp (120) is suspended by the housing assembly such that the lamp contacts an illumination optics mount associated with the illumination optics assembly (140) in an aligned and oriented manner. Such a configuration reduces the total number of tolerances associated with the formation of each of the components and thus the total number of tolerances associated with the resulting formation.

The terms "SLM" and "modulator" will be used interchangeably herein to refer to a spatial light modulator. The incident light may be modulated in its phase, intensity, polarization, or direction by the SLM (130). Thus, the SLM (130) of FIG. 1 modulates the light based on input from the image processing unit (110) to form an image-bearing beam of light that is eventually displayed or cast by display optics (150) on a viewing surface (not shown).

More specifically, the display optics (150) may include any device configured to display or project an image. For example, the display optics (150) may be, but are not limited to, a lens configured to project and focus an image onto a viewing surface. These display optics may also include an integrator rod or other optical element that homogenizes the light produced by the lamp (120). Many light sources, such as ultra-high pressure (UHP) mercury light sources, produce non-uniform light. An integrator rod aligns non-uniform light that passes therethrough such that the light that exits the integrator rod is more uniform. Once the light exits the integrator rod it passes through illumination lenses.

The illumination lenses, which may be referred to as condenser optics, are used to focus the light onto the SLM (130). The illumination lenses may include any number of suitable lenses of any number of sizes and thicknesses configured to focus light onto the SLM. The SLM (130) may be, but is not limited to, a digital mirror device (DMD), a single panel modulator device, a digital light processor (DLP) chip, and/or a liquid crystal on silicon (LCOS).

Light is then directed from the SLM to the viewing surface. The viewing surface may be, but is not limited to, a screen, television, wall, liquid crystal display (LCD), or computer monitor. Several exemplary embodiments of the lamp (120) and the illumination optics assembly (140) will be discussed in more detail below.

Schematic of Lamp and Illumination Optics Assembly

Figures 2, 3:
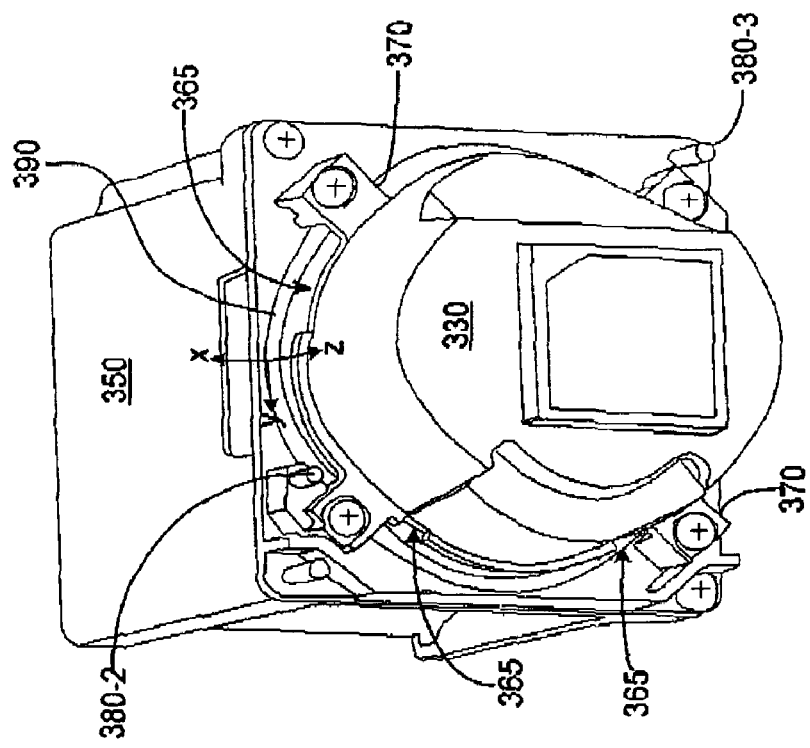
Figures 1, 3:
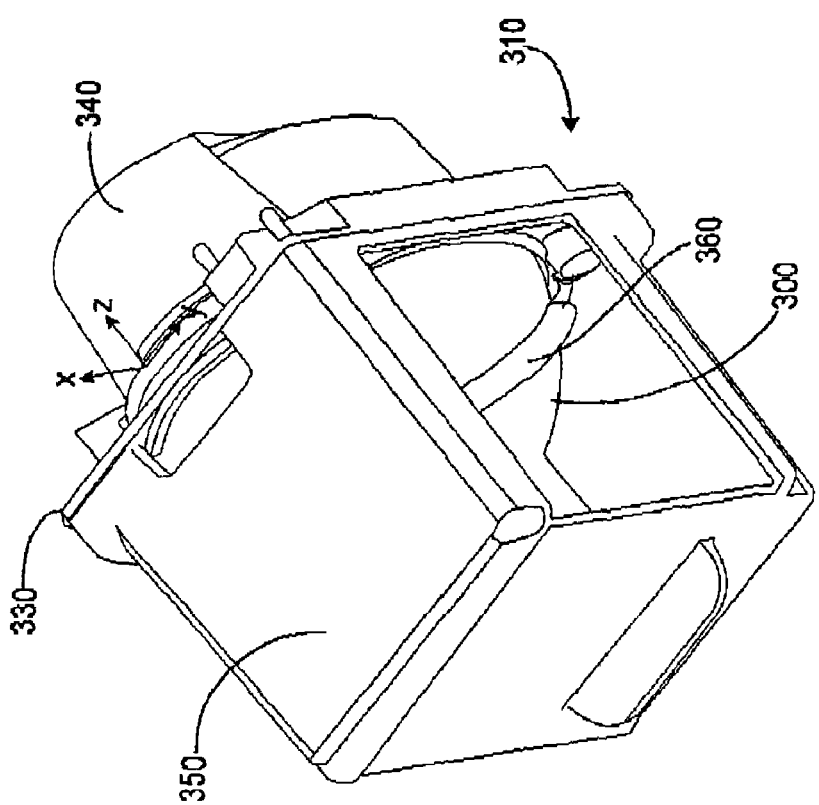

FIG. 2-1 illustrates a general schematic view of a lamp and illumination optics assembly interface (200) according to one exemplary embodiment. The assembly interface (200) generally includes a lamp (210), a housing assembly (220), and illumination optics assembly (230). The assembly interface (200) provides for a reliable and accurate alignment and coupling of the lamp (210) to the illumination optics assembly (230).

As shown in FIG. 2-1, the housing assembly (220) has an opening defined therein that allows the lamp (210) to be at least partially passed therethrough. A distal end (240) of the lamp (210) is shown protruding or extending partially through an opening in the housing assembly (220). A biasing member (250) exerts a biasing force on the lamp (210) that tends to maintain the lamp (220) in such a position relative to the housing assembly (220).

The illumination optics assembly (230) has a datum structure formed thereon that is configured to interact in a substantially direct manner with the lamp (210). The datum structure illustrated in FIGS. 2-1 and 2-2 are for illustrative purposes only. The datum structure includes a plurality of datum surfaces (260) configured to constrain the alignment of the lamp (210) with respect to the illumination optics assembly (230). One exemplary alignment configuration is shown in FIG. 2-2.

FIG. 2-2 shows the illumination optics assembly (230) in contact with the lamp (210). In particular, the illumination optics assembly (230) is coupled to the housing assembly (220). Coupling the illumination optics assembly (230) to the housing assembly (220) causes the datum surfaces (260) to come into contact with the lamp (210), thereby urging the lamp (210) back into the opening defined in the housing assembly (220). As the lamp (210) is thus moved, the biasing member (250) is deflected. The biasing member (250) exerts a biasing force in opposition to the deflection of the lamp (210).

The biasing force exerted on the lamp (210) thus causes the distal end (240) of the lamp (210) to be placed into contact with the illumination optics assembly (230). As will be discussed in more detail below, each of these components may be configured such that contact between the lamp (210) and the illumination optics assembly (230) occurs between the distal end (240) of the lamp (210) and the datum surfaces (260) on the illumination optics assembly (230). Because of this direct interaction of the lamp datums on the distal end (240) and the illumination optics datum surfaces (260) the tolerances of the lamp housing (220) may be removed from the final position accuracy of the lamp and thus may increase the accuracy of the assembly interface (200). As will be discussed in more detail below, the positional accuracy of the guide pins (380-2, 380-3; FIG. 3) are used to locate the lamp (210) roughly about the datum illumination optics datums (230) and help the spring (250) maintain a positive load of the lamp (210) against the datums on illumination optics assembly (230). An exemplary housing assembly and lamp will now be discussed with reference to FIGS. 3-1 and 3-2, followed by a discussion of an exemplary illumination optics assembly with respect to FIGS. 4-1 and 4-2.

Lamp and Housing Assembly

FIGS. 3-1 and 3-2 illustrate a lamp (300) that is at least partially surrounded by a housing assembly (310). FIG. 3-1 is a perspective view of the lamp (300) and housing assembly (310) and FIG. 3-2 is an end view of the lamp and housing assembly (310) taken from the distal end of the housing assembly (310). The housing assembly (310) includes an optics positioning member (330), a lamp positioning member (340), and a protective housing (350).

The lamp (300) is shown placed at least partially between the optics positioning member (330) and the lamp positioning member (340). This placement provides a preliminary location or placement of the lamp (300) with respect to the housing assembly (310). This location will be discussed with a coordinate system in which the origin is located as shown in FIG. 3-1. The coordinate system, which will be used in FIGS. 3-1, 3-2, 4-1, and 4-2, is for illustrative purposes and ease of reference only. The configuration of the housing assembly (310) preliminarily constrains the movement of the lamp (300) parallel to the z-axis. In particular, movement of the lamp (300) parallel to the positive z-axis is constrained by contact between the lamp (300) and the optics positioning member (330).

Similarly, movement of the lamp (300) parallel to the negative z-axis is constrained by contact between the lamp (300) and the lamp constraint member such as spring (360). Further, preliminary constraint of the movement of the lamp (300) parallel to the positive and negative x-axes and the positive and negative y-axes is constrained by contact between the perimeter of the lamp (300) and the optics positioning member (330) and/or the spring (360). Accordingly, the configuration of the housing assembly (310) provides a preliminary alignment of the lamp (300). Between these two x,y limits from the member (330), the lamp (300) is substantially free to translate against the biasing force of a spring (360) if sufficient load is applied to the lamp(300) to overcome the force of the spring (360).

Further, a biasing member, such as a spring (360) further constrains a preliminary position or location of the lamp (300) with respect to the housing assembly (310). In particular, the spring (360) urges the lamp (300) generally toward the optics positioning member (330). More specifically, the spring (360) urges the lamp toward down and left on as shown in FIG. 3-1. With respect to the coordinate designated above, the spring (360) urges the lamp toward the positive z and the negative x directions.

Figures 2, 4:
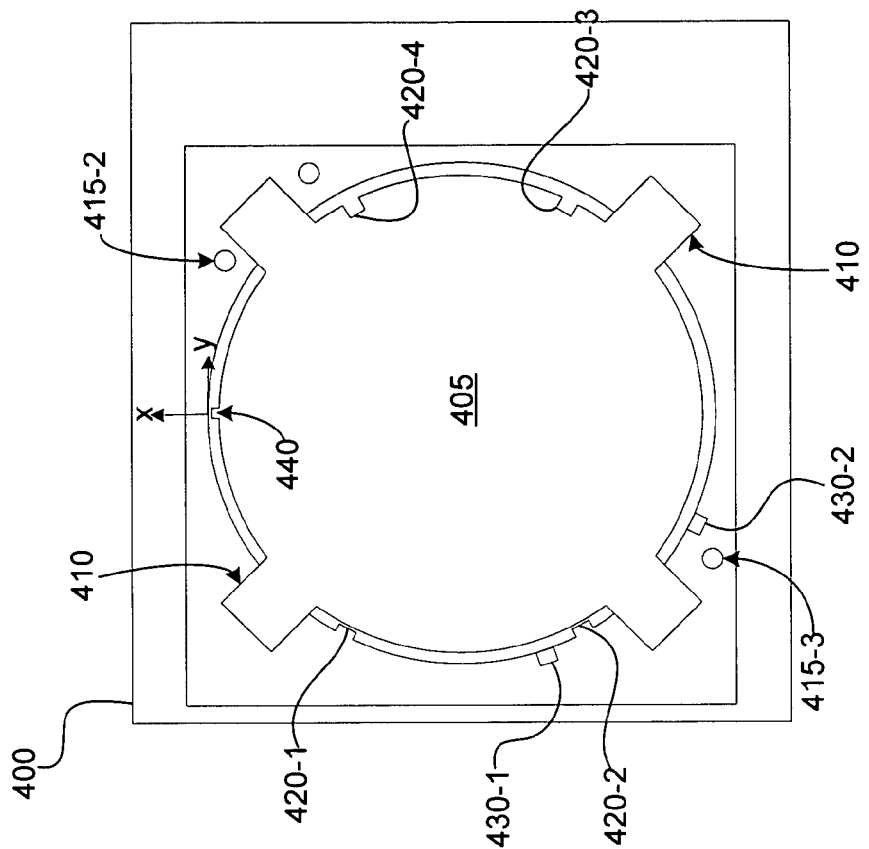
Figures 1, 4:
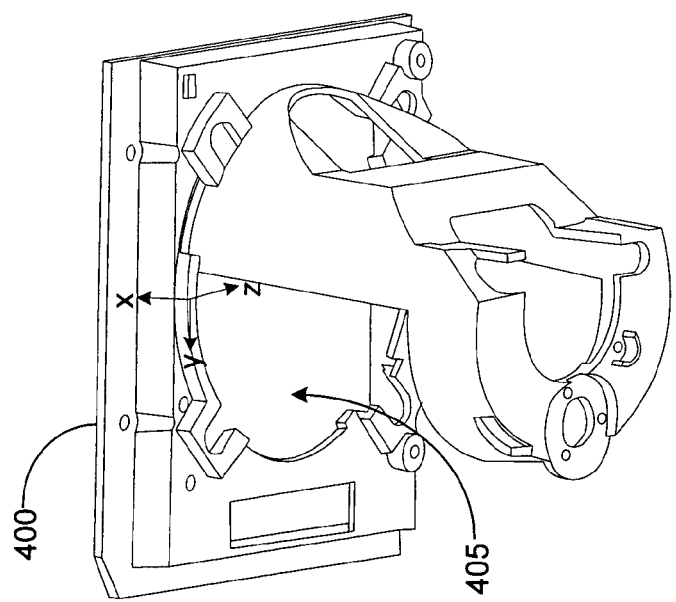

This biasing effect thus urges the lamp (300) toward the optics positioning member (330). The optics positioning member (330) includes a plurality of recesses (365) defined in the perimeter thereof. As will be discussed in more detail below, these recesses provide a pathway for interaction with the illumination optics mount (400; FIG. 4). In addition, the optics positioning member (330) includes tabs (370) and the lamp positioning member (340) includes a plurality of guide pins (380-2, 380-3). The tabs and the guide pins provide preliminary alignment between the housing assembly (310) with the lamp (300) therein and illumination optics (400; FIG. 4), as will be discussed in more detail below. Further, this exemplary configuration allows recesses defined on the illumination optics mount (400; FIG. 4) to contact a lip (390) of the lamp (300) while reducing or eliminating contact between the protrusions and the optics positioning member (330). The contact between the illumination optics and the lip (390) of the lamp (300) constrains the orientation and position of the lamp (300) with respect to the illumination optics.

Illumination Optics Interface

FIG. 4-1 illustrates a perspective view of an illumination optics mount (400) according to one exemplary embodiment. The illumination optics mount (400) is configured to interact with the lamp (300; FIG. 3) and the housing assembly (310; FIG. 3). As will be discussed in more detail below, this interaction directly orients and aligns the lamp (300; FIG. 3) with respect to the illumination optics mount (400).

The illumination optics mount (400) is configured to have illumination optics, such as lenses and/or integrator rods as well as any other suitable illumination optics coupled thereto. Such optics have been removed in FIGS. 4-1 and 4-2 ease of illustrating the interaction between the illumination optics mount (400) and the housing assembly (310) of FIGS. 3-1 and 3-2.

FIG. 4-2 is a partial-end view of the illumination optics mount (400) taken from the proximal thereof. FIG. 4-2 focuses on the datum structure of the illumination optics mount (400). The illumination optics mount (400) has an opening (405) defined therein that is configured to receive at least a portion of the optics positioning member (330; FIG. 3). Further, the illumination optics mount (400) includes a plurality of tab engaging recesses (410) defined therein that are configured to receive corresponding tabs (370; FIG. 3) formed on the optics positioning member (340; FIG. 3) these recesses provide clearance for tabs (370) only. The illumination optics mount (400) also includes holes (415-2, 415-3) defined therein configured to receive the guide pins (380-2, 380-3; FIG. 3) formed on the lamp positioning member (340; FIG. 3) and the optics positioning member (330; FIG. 3) respectively.

The contact between the aforementioned components thus provides a preliminary location of the illumination optics mount (400) relative to the housing assembly (310; FIG. 3). As previously discussed, the configuration of the housing assembly (310) provides a preliminary location of the lamp (300) with respect thereto. The alignment and orientation between the lamp (300; FIG. 3) and the illumination optics mount (400) will now be discussed in more detail.

In general, an object is able to move through six independent degrees of freedom. For example, if a rectangular coordinate system is chosen, an object may translate about the x-axis, the y-axis, and the z-axis. This translation represents three degrees of freedom. The other three degrees of freedom include rotation about the x-axis, the y-axis and/or the z-axis.

Referring to FIG. 4-2, as previously discussed, the opening (405) defined in the illumination optics mount (400) is configured to receive a portion of the optics positioning member (330). A datum structure is formed around the perimeter of this opening (405). In the exemplary embodiment shown, the datum structure includes four z-axis translation limiting members (420-1, 420-2, 420-3, 420-4), two perimeter location members (430-1, 430-2).

As previously discussed with reference to FIG. 3-2, the recesses (365) in the perimeter of the optics positioning member (330) provide a pathway for contact between the lamp (300) and the illumination optics mount (400). In particular, the recesses (365) allow each of the members of the datum structure to contact the lip (390) of the lamp in a substantially direct manner.

More specifically, referring to both FIGS. 3-2 and 4-2, as previously discussed, the spring (360) biases the lamp (300) toward the optics positioning member (330). When the illumination optics mount (400) is coupled to the optics positioning member, the datum structure, including the z-axis translation limiting members (420-1, 420-2, 420-3, 420-4) extends beyond the optics positioning member (330), which is received within the illumination optics mount (400).

This coupling is accomplished while reducing or eliminating contact between the datum structure and the optics positioning member (330). In other words, a portion of the optics positioning member (330) is received within the illumination optics mount (400) such that the datum structure extends at least partially beyond the proximal end of the optics positioning member (330), thereby causing the illumination optics mount (400) to come into substantially direct contact with the lip (390) of the lamp (300).

In particular, as the lamp (300), which is surrounded by the housing assembly (310), is coupled to the illumination optics mount (400), the tabs (370) and the guide pins (380-2, 380-3) on the housing assembly (310) are coupled to the corresponding tab engaging recesses (410) and holes (415-2, 415-3) on the illumination optics mount (400). As the guide pins and holes and the tabs and recesses are coupled, the illumination optics mount (400) and lamp (300) are coupled together at the interface between the lip (390) and the illumination optics mount (400). In this configuration, the lamp (300) is biased into contact with the illumination optics mount (400) such that the lamp (300) is free to translate with respect to the housing assembly (310). Accordingly, the position of the lamp (300) is constrained by the contact between the lamp (300) and the illumination optics assembly (400).

More specifically, the two perimeter location members (430-1, 430-2), according to one exemplary embodiment, are chamfered or tapered. As a result, when the lip (390) is pushed into contact with the perimeter location members (430-1, 430-2), the lip (390) is urged in the positive x and y directions with respect to the designated coordinate system. As the lip (390) is pushed into further contact with the illumination optics mount (400), the lip (390) comes into contact with the flat sided portions of the perimeter location members (430-1, 430-2). This motion is opposed by the spring (360), which tends to urge the lip (390) in the negative x and negative y directions. Accordingly, the spring maintains the lip (390) in contact with the perimeter location members (430-1, 430-2).

This contact constrains the alignment of the lamp (300) relative to the illumination optics mount (400) with respect to translation parallel to both the x-axis and the y-axis. Translation with respect to motion parallel to the z-axis and with respect to rotation about the x-axis and the y-axis is constrained by contact between the lip (390) and the z-axis translation limiting members (420-1, 420-2, 420-3, 420-4). In particular, the four z-axis translation limiting members (420-1, 420-2, 420-3, 420-4) are substantially coplanar. Consequently, placing the lip (390) in simultaneous contact with each of the members causes the distal end of the lip (390) to be placed in a single plane, thereby constraining translation of the lamp to translation in this plane.

The plane containing the z-axis limitation members is generally parallel to both the x-axis and the y-axis. Accordingly, placing the lip (390) in contact with the z-axis translation limiting members (420-1, 420-2, 420-3, 420-4) constrains the position of the lamp (300) relative to the illumination optics mount (400) with respect to translation parallel to the z-axis and rotation about the x-axis and the y-axis. Further, as previously discussed, simultaneous contact between the lip (390) and the perimeter location members (430-1, 430-2) constrains the position of the lamp (300) relative to the illumination optics mount (400) with respect to translation parallel to the x-axis and the y-axis.

The constraint of location and orientation of the lamp (300) relative to the illumination optics mount (400) with respect to five of the six degrees of freedom introduced have been discussed. These five degrees of freedom include translation parallel to the x-axis, the y-axis, and the z-axis and rotation about the x-axis and the y-axis. The constraint of rotation about the z-axis will now be discussed.

The z-axis rotation limiting member (440) according to one exemplary embodiment, is a recess defined in the optics mount (340). The z-axis rotation limiting member (440) is configured to receive a corresponding tab formed on the lip (390) of the lamp (300). Placement of the tab within the z-axis rotation limiting member (440) thereby constrains rotation of the lamp (300) relative to the illumination optics mount (400).

Accordingly, the lamp (300) may be coupled directly to the illumination optics mount (400), thereby increasing the accuracy of the location and alignment of the lamp (300) with respect to the optics housing (400). By increasing the accuracy of the position of the lamp with respect to the illumination optics, a larger percentage of the light produced by the light source is directed to the SLM (130; FIG. 1) resulting in a more efficient display system (100).

Method of Forming an Illumination Optics and Lamp Assembly

Figure 5:
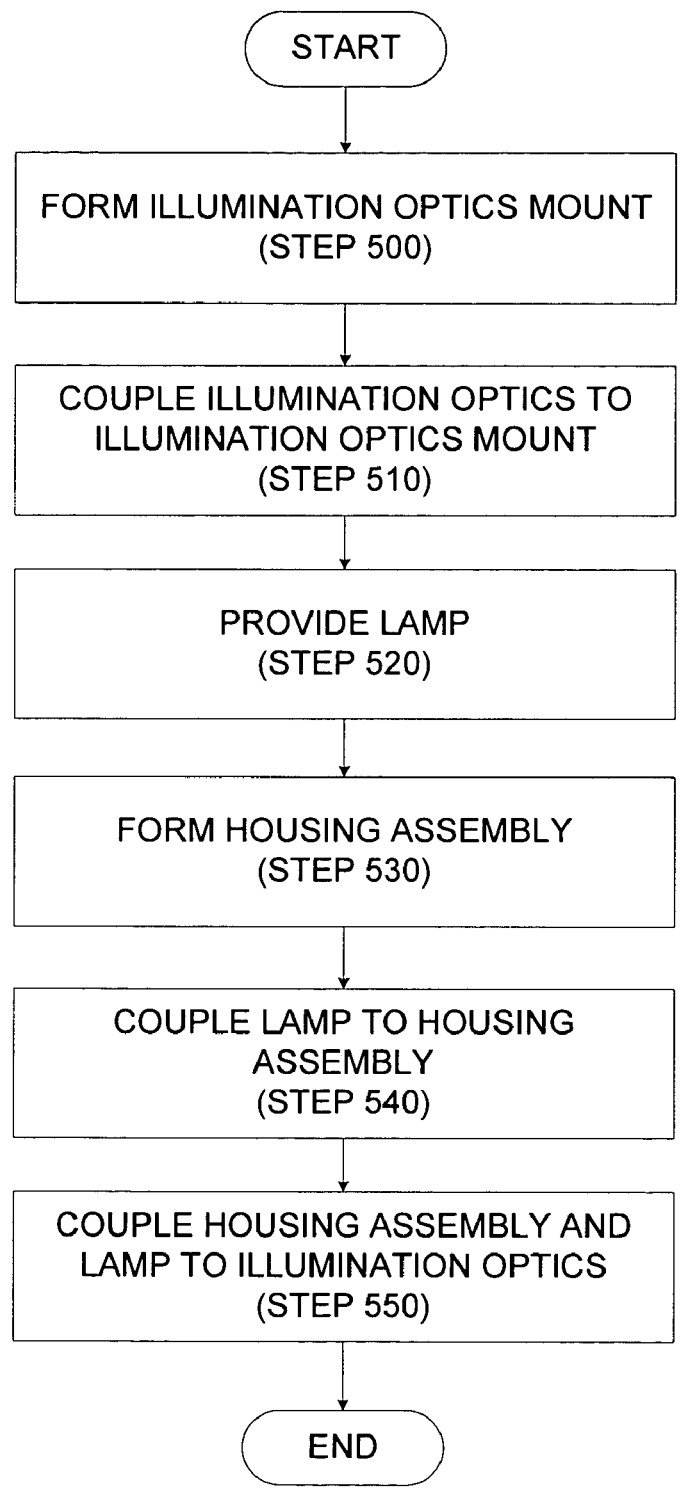
FIG. 5 is a flowchart illustrating a method of forming an illumination optics assembly to lamp interface according to one exemplary embodiment.

FIG. 5 is a flowchart illustrating a method of forming an interface between an illumination optics and lamp assembly according to one exemplary embodiment. One exemplary method is described herein in a particular order. Those of skill in the art will understand that the steps may be performed in several different orders and the present description is provided for ease of reference only. Further, not all of the steps need be performed.

As illustrated in FIG. 5, the present exemplary method begins by forming an illumination optics mount (step 500). The illumination optics mount is configured to have illumination lenses coupled thereto. The illumination optics mount also includes a datum structure formed thereon having a plurality of datum features. The datum structure is configured to interface with a lamp. The illumination optics mount may also include recesses and holes defined therein configured to receive tabs and guide pins respectively. The illumination optics housing, including the datum features, may be formed using any appropriate processes, including, but not limited to, molding, machining, and/or a combination of both.

Once the illumination optics mount is formed, the illumination optics are then coupled to the illumination optics mount (step 510) to form an illumination optics assembly. The illumination optics may include, but is not limited to lenses and an integrator rod.

Thereafter, a lamp is provided (step 520). The lamp may include a reflector and burner, such as a ultra-high pressure (UHP) or any other suitable light source. A housing assembly is also formed (step 530). The housing assembly is configured to have the lamp coupled thereto (step 540), such as to provide a preliminary alignment of the lamp with respect to the illumination optics assembly. In particular, the housing assembly may include a biasing member configured to urge the lamp toward the illumination optics assembly, such that when the housing assembly is coupled to the illumination optics assembly (step 550), the spring maintains the lamp in contact with the datum structure on the illumination optics housing.

According to one exemplary embodiment, the lamp floats, or is able to translate with respect to the housing assembly such that the lamp contacts the spring and the datum structure on the illumination optics housing. Such a configuration reduces the total number of tolerances associated with the lamp and illumination optics assembly.

In conclusion, a lamp and illumination optics assembly are configured to be coupled in a substantially direct member. Such a configuration may increase the overall accuracy of the lamp position with respect to the illumination optics and the rest of an optical path, thereby increasing the overall efficiency of the assembly and a system of which the assembly is a part.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. A lamp and illumination optics assembly interface, comprising:
    an illumination optics mount having a plurality of datum features formed thereon;
    a lamp;
    a lamp housing in which said lamp is removably installed, wherein said lamp housing is configured to bring said lamp into contact with a first set of said datum features when coupled with said illumination optics mount; and
    an optics positioning member on said lamp housing, said optics positioning member configured to mate with a second set of said datum features to align said illumination optics mount with respect to said lamp housing.

2. The interface of claim 1, and further comprising a biasing member coupled to said housing and said lamp, wherein said biasing member is configured to bias said lamp in contact with said first set of datum features.

3. The interface of claim 1, wherein said optics positioning member further comprises an opening defined therein around which is disposed a second plurality of datum features.

4. The interface of claim 3, wherein said second plurality of datum features of said optics positioning member includes a plurality of z-axis translation limiting members.

5. The interface of claim 1, wherein said second set of datum features includes a plurality of receptacles for guide pins and said illumination optics mount includes a corresponding plurality of guide pins.

6. The interface of claim 2, wherein said biasing member applies a biasing force both parallel to an optical axis of said lamp and laterally to said optical axis of said lamp.

7. A lamp and illumination optics assembly interface, comprising:
- an illumination optics mount having a plurality of datum features formed thereon; and
- a lamp wherein said lamp is configured to be substantially directly coupled to said illumination optics mount;
- wherein said datum features comprise:
  - at least one perimeter location member, wherein said perimeter location member comprises a tapered section that couples with corresponding datum features on said lamp and aligns said lamp with respect to said illumination optics mount when said lamp moves toward said illumination optics mount along an optical axis of said illumination optics mount;
  - wherein said perimeter location member including said tapered section is configured to cause said lamp to move into a direction opposite a biasing force applied thereto when said lamp is coupled to said illumination optics mount.

8. The interface of claim 7, wherein said datum features further comprise at least one z-axis translation limiting member for constraining movement of said lamp toward said illumination optics mount along said optical axis; wherein z-axis translation limiting member and said perimeter location member are configured to be placed in simultaneous contact with said lamp.

9. An assembly for use in projector systems, comprising:
- an illumination optics assembly having an illumination optics mount, said illumination optics mount having a plurality of datum features;
- a housing member coupled to said illumination optics assembly;
- a lamp removably coupled to said housing member such that said lamp is coupled directly to said datum features; and
- an optics positioning member on a said housing member, said optics positioning member configured to mate with said datum features to align said illumination optics mount with respect to said housing member.

10. The assembly of claim 9, wherein said illumination optics assembly includes lenses and an integrator rod coupled to said illumination optics mount.

11. The assembly of claim 9, wherein said housing member includes a lamp positioning member and a lip of said lamp is positioned at least partially between said lamp positioning member and said optics positioning member.

12. The assembly of claim 11, and further comprising a biasing member configured to apply a biasing force to said to urge said lamp toward said illumination optics assembly and wherein said lamp is able to move between said lamp positioning member and said optics positioning member.

13. An assembly for use in projector systems, comprising:
- an illumination optics assembly having an illumination optics mount, said illumination optics mount having a plurality of datum features;
- a housing member coupled to said illumination optics assembly;
- a lamp coupled to said housing member such that said lamp is coupled to said datum features, said housing member being configured such that said lamp moves with respect to said housing member when said lamp is coupled to said datum features; and
- a biasing member configured to apply a biasing force to urge said lamp toward said illumination optics assembly such that said movement of said lamp with respect to said housing member is against said biasing force.

14. The assembly of claim 13, wherein said biasing member applies said biasing force both parallel to an optical axis of said lamp and laterally to said optical axis of said lamp.

15. A display system, comprising:
- an imaging processing unit;
- a light source;
- an illumination optics assembly which includes an illumination optics mount having a plurality of datum features formed thereon;
- a lamp;
- a biasing member coupled to said lamp to bias said lamp into direct contact with said datum features;
- a spatial light modulator in optical communication with said illumination optics assembly; and
- a lamp positioning member coupled to said biasing member and to an optics positioning member, such that said lamp is able to move between said optics positioning member and said lamp positioning member.

16. The system of claim 15, and further comprising said optics positioning member having an opening defined therein to receive a portion of said lamp and wherein said illumination optics assembly includes an opening defined therein configured to receive a portion of said optics positioning member.

17. The system of claim 15, wherein said illumination optics assembly includes an integrator rod.

18. The system of claim 15, wherein said illumination optics includes illumination lenses.

* * * * *